United States Patent
Pistoia et al.

(10) Patent No.: US 8,984,642 B2
(45) Date of Patent: *Mar. 17, 2015

(54) DETECTING SECURITY VULNERABILITIES IN WEB APPLICATIONS

(71) Applicant: International Business Machines Corporation, Armonk, NY (US)

(72) Inventors: Marco Pistoia, Amawalk, NY (US); Ori Segal, Tel Aviv (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/785,254

(22) Filed: Mar. 5, 2013

(65) Prior Publication Data

US 2013/0179979 A1    Jul. 11, 2013

Related U.S. Application Data

(63) Continuation of application No. 13/174,628, filed on Jun. 30, 2011, now Pat. No. 8,695,098.

(51) Int. Cl.
*G06F 11/00* (2006.01)
*G06F 21/57* (2013.01)
*H04L 29/06* (2006.01)

(52) U.S. Cl.
CPC .......... *G06F 21/577* (2013.01); *H04L 63/1433* (2013.01)
USPC .......................................................... 726/25

(58) Field of Classification Search
CPC .............. G06F 21/577; H04L 63/1433; H04L 63/1416
USPC ....................................................... 726/22–25
See application file for complete search history.

(56) References Cited

U.S. PATENT DOCUMENTS 7,451,352 B1 * 11/2008 Moore et al. ............... 714/38.14
7,752,609 B2    7/2010 Rioux
(Continued)

FOREIGN PATENT DOCUMENTS

CN    101159732    4/2008

OTHER PUBLICATIONS

Hsu, F., "Input Validation of Client-Server Web Applications Through Static Analysis", University of California, Davis; date unknown; all pages.
(Continued)

*Primary Examiner* — Anthony Brown
(74) *Attorney, Agent, or Firm* — North Shore Patents, P.C.; Michele Liu Baillie

(57) ABSTRACT

Method to detect security vulnerabilities includes: interacting with a web application during its execution to identify a web page exposed by the web application; statically analyzing the web page to identify a parameter within the web page that is constrained by a client-side validation measure and that is to be sent to the web application; determining a server-side validation measure to be applied to the parameter in view of the constraint placed upon the parameter by the client-side validation measure; statically analyzing the web application to identify a location within the web application where the parameter is input into the web application; determining whether the parameter is constrained by the server-side validation measure prior to the parameter being used in a security-sensitive operation; and identifying the parameter as a security vulnerability.

2 Claims, 3 Drawing Sheets

(56) References Cited

U.S. PATENT DOCUMENTS

| | | |
|---|---|---|
| 2003/0159063 A1 | 8/2003 | Apfelbaum et al. |
| 2006/0259973 A1 | 11/2006 | Sima et al. |
| 2010/0169974 A1 | 7/2010 | Calendino et al. |

OTHER PUBLICATIONS

Aljawarneh, S. et. al., "Developing a Semantic Architecture for Input Validation in e-Systems"; UbiCC Journal, vol. 4, No. 3, Special Issue on ICIT 2009 Conference; 2009; pp. 501-508.

Johnson, P. et al., "10 Steps to Securing Your Web Applications", Unisys Corporation; 2006; all pages.

Balzarotti, D. et al., "Saner: Composing Static and Dynamic Analysis to Validate Sanitization in Web Applications"; 2008 IEEE Symposium on Security and Privacy; 2008; pp. 387-401.

Aljawarneh, S. et al., "A Semantic Data Validation Service for Web Applications"; Journal of Theoretical and Applied Electronic Commerce Research, ISSN 0718-1876, Electronic Version; vol. 5, Issue 1; Apr. 2010; pp. 39-55.

Monga, M. et al. "A Hybrid Analysis Framework for Detecting Web Application Vulnerabilities"; SESS'09; May 19, 2009; Vancouver, Canada; pp. 25-32.

Wassermann, G. et al., "Static Detection of Cross-Site Scripting Vulnerabilities"; ICSE'08; May 10-18, 2008; Leipzig, Germany; pp. 171-180.

Mao, C., "Experiences in Security Testing for Web-Based Applications"; ICIS 2009; Nov. 24-26, 2009; Seoul, Korea; pp. 326-330.

Petukhov et al., "Detecting Security Vulnerabilities in Web Applications Using Dynamic Analysis with Penetration Testing"; OWASP AppSec Europe 2008 Conference, May 19-22, 2008, Ghent, Belgium, pp. 1-16.

\* cited by examiner

DETECTING SECURITY VULNERABILITIES IN WEB APPLICATIONS

CROSS-REFERENCE TO RELATED APPLICATIONS

The present application relates to co-pending U.S. patent application Ser. No. 13/174,628, filed on Jun. 30, 2011.

BACKGROUND

Internet-based computer software applications, or "web" applications, may be vulnerable to malicious attacks if they do not properly validate user inputs before processing them and using them in security-sensitive operations. A common practice is to perform such validation by constraining user inputs at the web application interfaces with which users interact. Thus, for example, an HTML-based web page that is presented to a user may include parameters that are to be populated only via drop-down boxes with a limited set of predefined values for selection by the user, as well as hidden parameters that are not meant to be directly modified by the user, where the parameters are then to be forwarded to the underlying web application

BRIEF SUMMARY

Embodiments provide detection of security vulnerabilities in web applications. In one embodiment, a method includes interacting with a web application during its execution to identify a web page exposed by the web application; and statically analyzing the web page to identify a parameter within the web page that is constrained by a client-side validation measure and that is to be sent to the web application. The method further includes determining a server-side validation measure to be applied to the parameter in view of the constraint placed upon the parameter by the client-side validation measure; and statically analyzing the web application to identify a location within the web application where the parameter is input into the web application. The method further includes determining whether the parameter is constrained by the server-side validation measure prior to the parameter being used in a security-sensitive operation; and identifying the parameter as a security vulnerability where the parameter is not constrained by the server-side validation measure prior to the parameter being used in the security-sensitive operation.

BRIEF DESCRIPTION OF THE DRAWINGS

The embodiments will be understood and appreciated more fully from the following detailed description taken in conjunction with the appended drawings in which.

DETAILED DESCRIPTION

Figure 1:
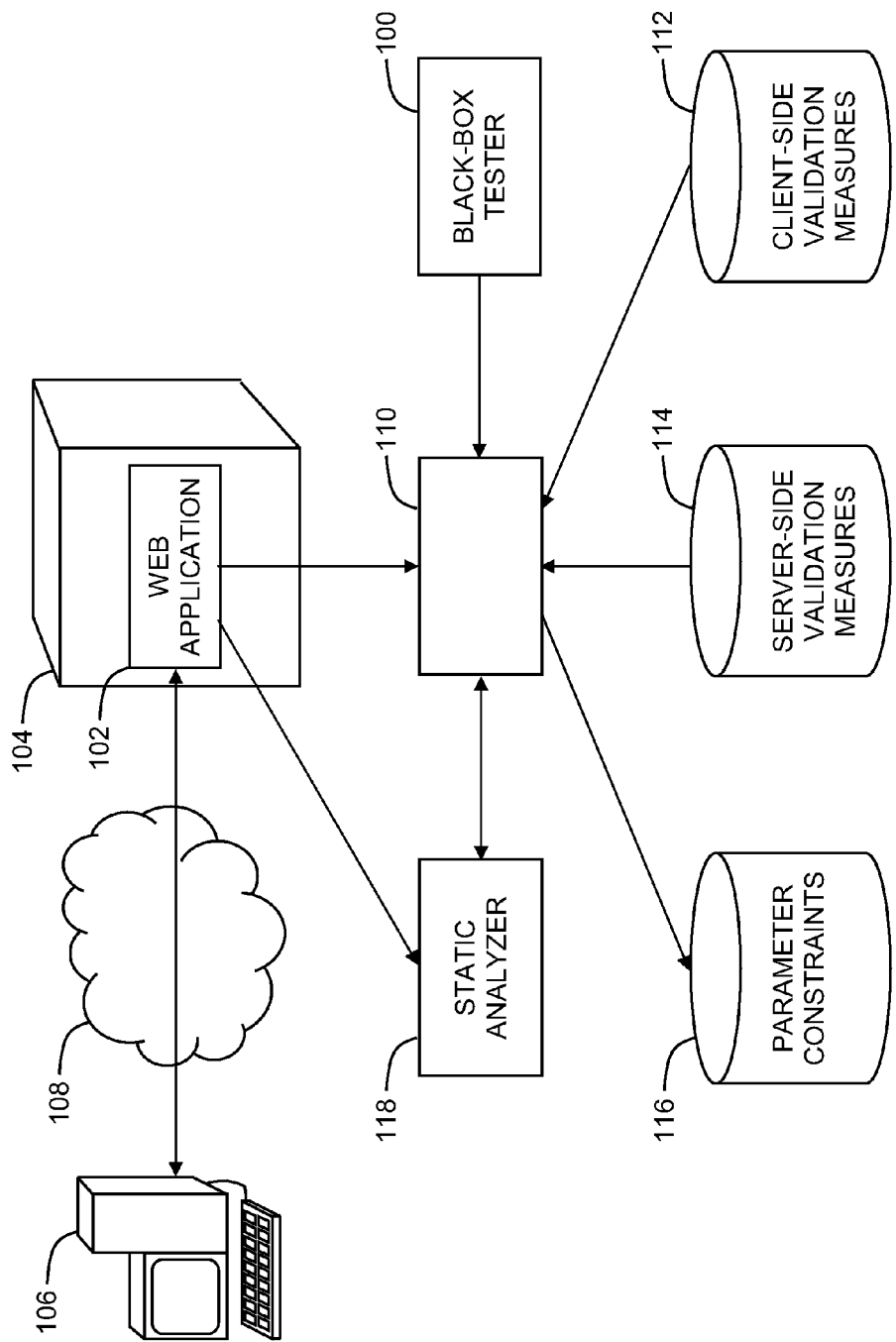
FIG. 1 is a simplified conceptual illustration of a system for detecting security vulnerabilities in web applications that employ client-side validation, constructed and operative, in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for detecting security vulnerabilities in web applications that employ client-side validation, constructed and operative in accordance with an embodiment. In the system of FIG. 1, in one embodiment, a black-box tester 100, such as IBM Rational AppScan™, commercially-available from International Business Machines Corporation, Armonk, N.Y., is configured to interact with a web application 102 during its execution in accordance with conventional black-box testing techniques to identify any statically or dynamically generated web pages exposed by web application 102. Web application 102 may be any computer-based software application that may be hosted by a computer server 104 and accessed by one or more client computers 106 via a computer network 108, such as the Internet.

In one embodiment, a constraint manager 110 is configured to statically analyze the web pages identified by black-box tester 100 to identify parameters within the web pages that are constrained by one or more predefined client-side validation measures 112 and that are to be sent to web application 102 at server 104. Such client-side validation measures 112 may, for example, include:

where the parameter is a hidden parameter;
where the parameter is a parameter to which a value is assigned by selecting from among a list of pre-defined values, such as via drop-down box; and
where the parameter is a parameter for which a client-side test is performed to determine whether its value conforms to a regular expression.

In one embodiment, constraint manager 110 may determine one or more server-side validation measures 114 that should be applied to a given parameter in view of the constraints placed upon the parameter by client-side validation measures 112. Such server-side validation measures 114 may, for example, include:

where the parameter is a hidden parameter, that web application 104 checks for a correlation between its value and the values of other client-supplied parameters. For example, if the candidate parameter with a web page is a Boolean hidden field called 'isAdmin', which is set by JavaScript™ code within the web page when the user inputs a username and password, the client-side constraint is that 'isAdmin' is correlated with the input username and password;
where the parameter is a parameter to which a value is assigned by selecting from among a list of pre-defined values, such as via drop-down box, that web application 104 checks that the value belongs to a fixed set of values or a predefined range of values; and
where the parameter is a parameter for which a client-side test is performed to determine whether its value conforms to a regular expression, that web application 104 performs the same test.

In one embodiment, constraint manager 110 may store identified parameters together with their applicable server-side validation measures 114 in a data store of parameter constraints 116.

In one embodiment, a static analyzer 118 may be configured to statically analyze web application 104, such as by building a control-flow model and a data-flow model of web application 104, to identify locations within web application 104 where web page parameters are input into web application 104. For any given parameter so identified, static analyzer 118 queries constraint manager 110, or alternatively accesses parameter constraints 116 directly, to determine which constraints should be applied to the parameter, and whether these constraints are applied to the parameter by web application 104 prior to the parameter being used in a security-sensitive operation. Static analyzer 118 identifies as a security vulnerability any parameter that is not constrained within web application 104 by applicable server-side validation measures 114 prior to the parameter being used in a security-sensitive operation. Static analyzer 118 provides a report on the identified security vulnerabilities of web application 104, such as to an operator of black-box tester 100 or static analyzer 118.

Figure 2:
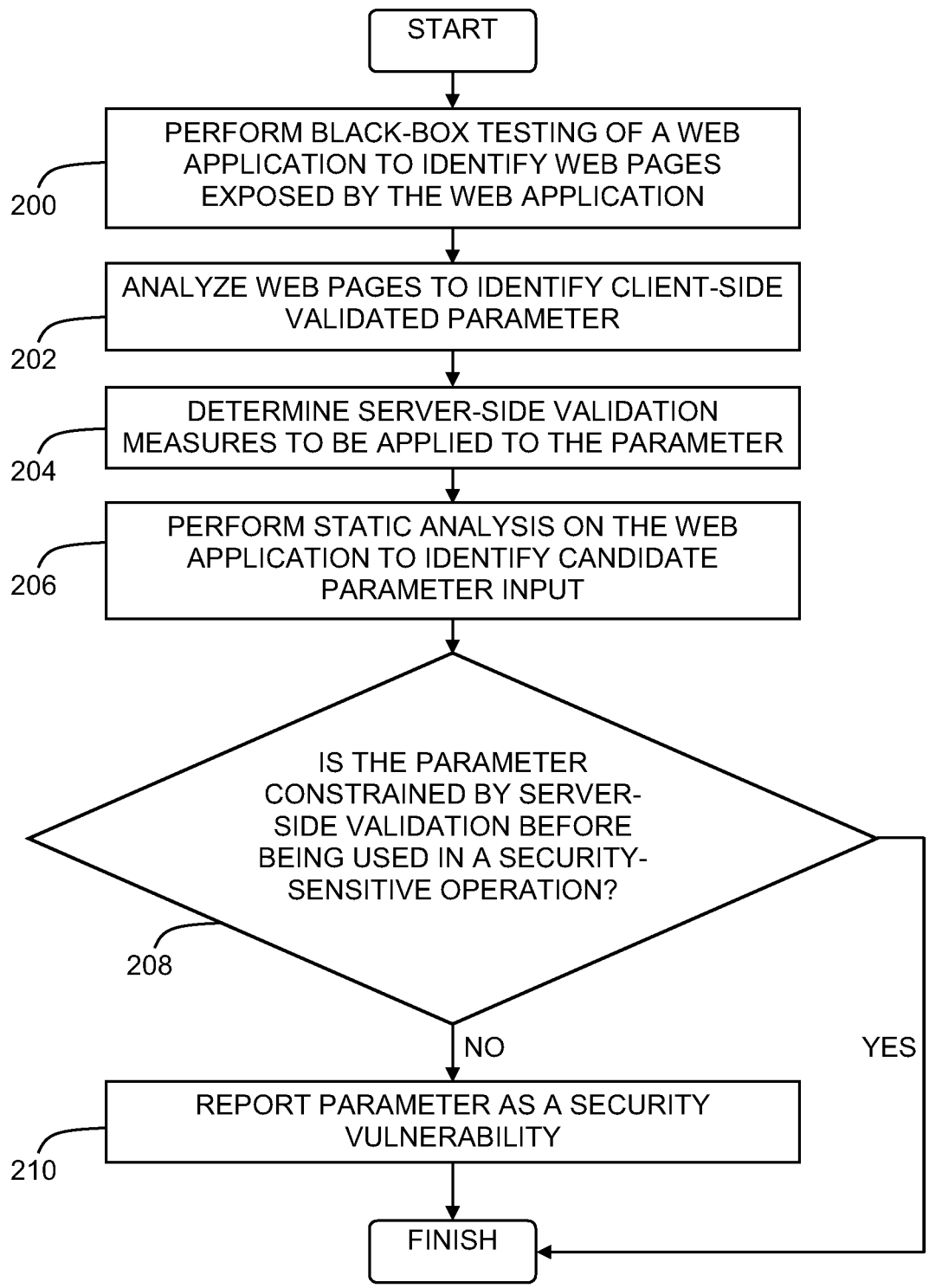
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment. In the method of FIG. 2, in one embodiment, black-box testing of a web application may be performed during its execution to identify any statically or dynamically generated web pages exposed by the web application (block 200). The system statically analyzes identified web pages to identify any parameters within the web pages that are constrained by one or more predefined client-side validation measures and that are to be sent to the web application (block 202). The system determines one or more server-side validation measure that should be applied to a given parameter in view of the constraints placed upon the parameter by client-side validation measures (block 204). The system performs static analysis on the web application to identify locations within the web application where web page parameters are input into the web application (block 206). If a parameter is not constrained within the web application by applicable server-side validation measures prior to the parameter being used in a security-sensitive operation (block 208), the system identifies the parameter as a security vulnerability and reported (block 210).

The system of FIG. 1 and method of FIG. 2 may be demonstrated in the context of the following example in which black-box tester 100 interacts with web application 104 during its execution and is presented with a web page having a log-in form. In one embodiment, constraint manager 110 analyzes the web page, determines that the log-in form includes a hidden flag which indicates whether the user is an administrator, and determines that the hidden flag should be correlated with values held by other parameters coming from the user. In one embodiment, static analyzer 118 finds the relevant set of calls within web application 104 in the form <y>=<x>.getParameter('admin'), where <x> and <y> are placeholders for variable identifiers whose static types are HttpServletRequest and Boolean, respectively. Static analyzer 118 then checks whether the value of <y> is used to directly or indirectly control the flow of the execution without web application 104 first checking whether this value is correlated with values held by other parameters coming from the user. Static analyzer 118 reports the hidden flag as a security vulnerability if security-sensitive operations reachable from the 'getParameter' statement are dominated solely by a test on <y>, as server-side validation measures are not found that adequately constrain the hidden flag, since a simple manipulation of the hidden flag before it is sent to web application 104 may be sufficient to turn an ordinary user into an administrator, potentially giving the ordinary user absolute control over the application.

Figure 3:
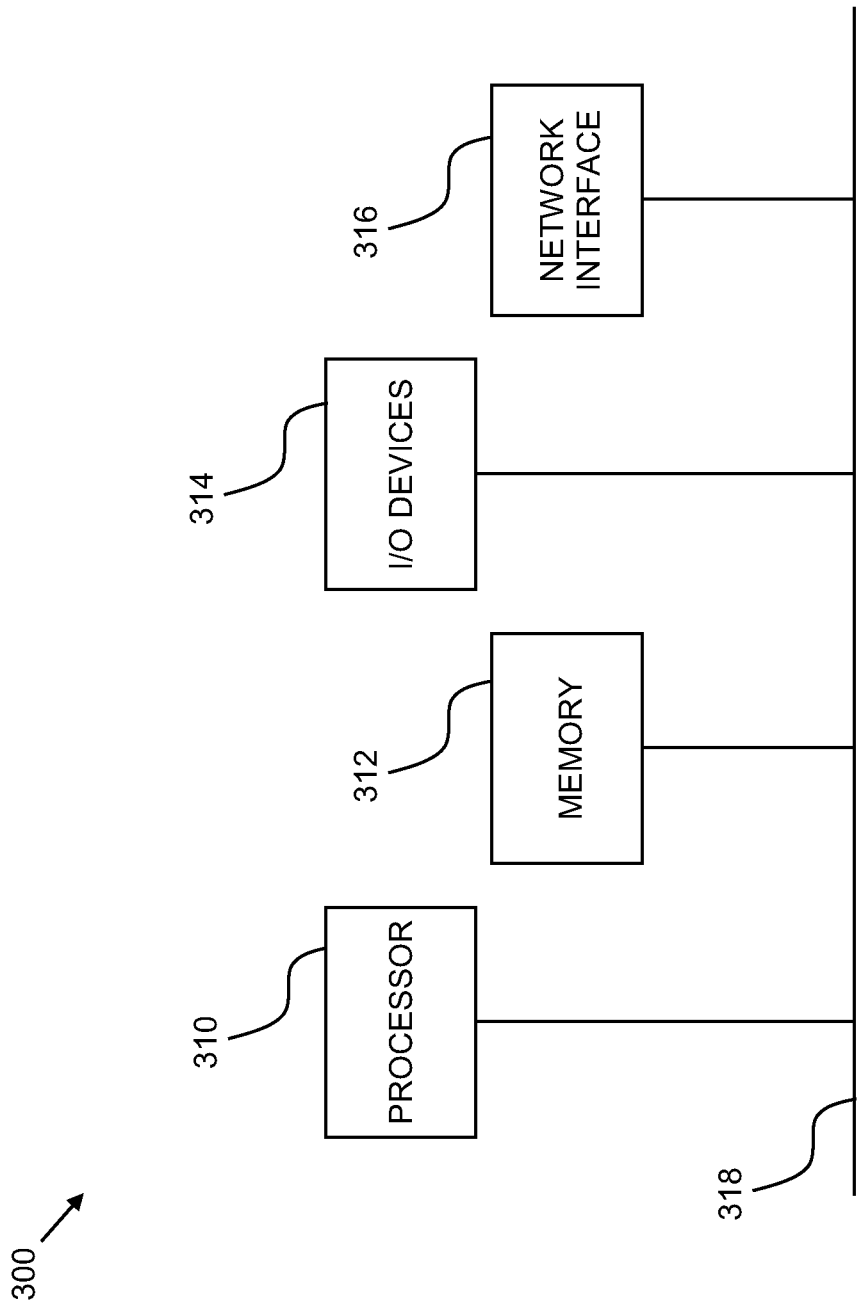
FIG. 3 is a simplified block diagram illustration of an exemplary hardware implementation of a computing system, constructed and operative, in accordance with an embodiment of the invention.

Referring now to FIG. 3, block diagram 300 illustrates an exemplary hardware implementation of a computing system with which one or more components/methodologies (e.g., components/methodologies described in the context of FIGS. 1-2) may be implemented, according to an embodiment.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described herein may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method implemented by a hardware processor, comprising:

interacting, by the hardware processor, with a web application during its execution to identify a web page exposed by the web application, the web application being hosted by a server and accessible by a client computer;

statically analyzing the web page to identify a hidden parameter within the web page that is constrained by a client-side validation measure and that is to be sent to the web application, the hidden parameter to indicate an authorization level of a user of the client computer;

determining a server-side validation measure to be applied to the hidden parameter comprising the web application checking for a correlation between a value of the hidden parameter and a value of at least one other parameter from the user;

statically analyzing the web application to identify a location within the web application where the hidden parameter is input into the web application;

querying for the server-side validation measure to be applied to the hidden parameter;

determining whether the web application checks for the correlation between the value of the hidden parameter and the value of the at least one other client-supplied parameter according to the server-side validation measure prior to the hidden parameter being used in a security-sensitive operation; and identifying the hidden parameter as a security vulnerability where the web application does not check for the correlation between the value of the hidden parameter and the value of the at least one other client-supplied parameter prior to the hidden parameter being used in the security-sensitive operation.

2. The method of claim 1 further comprising building a control-flow model and a data-flow model of the web application.

\* \* \* \* \*